(12) United States Patent
Kaluza et al.

(10) Patent No.: US 10,305,738 B2
(45) Date of Patent: May 28, 2019

(54) SYSTEM AND METHOD FOR CONTEXTUAL CLUSTERING OF GRANULAR CHANGES IN CONFIGURATION ITEMS

(71) Applicant: ESI SOFTWARE LTD, Rosh Ha'Ayin (IL)

(72) Inventors: Bostjan Kaluza, Ljubljana (SI); Eyal Oz, Petach-Tikva (IL); Alexander Gilenson, Givatayim (IL)

(73) Assignee: ESI SOFTWARE LTD., Rosh Ha'Ayin (IL)

( * ) Notice: Subject to any disclaimer, the term of this patent is extended or adjusted under 35 U.S.C. 154(b) by 268 days.

(21) Appl. No.: 14/988,844

(22) Filed: Jan. 6, 2016

(65) Prior Publication Data

US 2017/0195178 A1    Jul. 6, 2017

(51) Int. Cl.
  *H04L 12/24* (2006.01)
  *G06F 16/28* (2019.01)
  *G06Q 10/00* (2012.01)

(52) U.S. Cl.
  CPC ........ *H04L 41/0853* (2013.01); *G06F 16/285* (2019.01); *G06Q 10/00* (2013.01); *H04L 41/0816* (2013.01); *H04L 41/0893* (2013.01); *H04L 41/046* (2013.01)

(58) Field of Classification Search
  CPC ............. H04L 41/0853; H04L 41/0816; H04L 41/0893; H04L 41/046; G06F 17/30598; G06F 16/285; G06Q 10/00
  See application file for complete search history.

(56) References Cited

U.S. PATENT DOCUMENTS

| | | | |
|---|---|---|---|
| 7,822,785 B2 | 10/2010 | Ayachitula et al. | |
| 8,719,269 B2 | 5/2014 | Sekiguchi et al. | |
| 8,843,503 B2 | 9/2014 | Ayachitula et al. | |
| 2006/0064486 A1* | 3/2006 | Baron | H04L 41/0886 709/224 |
| 2008/0005187 A1 | 1/2008 | Ayachitula et al. | |
| 2009/0172687 A1* | 7/2009 | Bobak | G06Q 10/06 718/104 |
| 2010/0057780 A1* | 3/2010 | Isobe | G06F 8/71 707/E17.045 |
| 2011/0179031 A1* | 7/2011 | Sekiguchi | G06F 17/30566 707/737 |
| 2013/0055090 A1* | 2/2013 | Carmel | H04L 41/085 715/735 |
| 2013/0097138 A1 | 4/2013 | Barkol et al. | |
| 2014/0108625 A1 | 4/2014 | Carmel et al. | |

(Continued)

FOREIGN PATENT DOCUMENTS

WO    2011149464 A1    12/2011

*Primary Examiner* — Kris E Mackes
*Assistant Examiner* — Lin Lin M Htay
(74) *Attorney, Agent, or Firm* — Soroker Agmon Nordman (57) ABSTRACT

A method of clustering changes to configuration items in an information technology (IT) system, including collecting changed configuration items executed on computer stations connected in a network implementing the information technology system, storing the collected configuration items in a database, analyzing contextual information related to the configuration items to identify clusters having similar characteristics, clustering the configuration items based on the identified clusters having similar characteristics, and assigning a descriptor to each cluster to identify it as an IT action.

16 Claims, 5 Drawing Sheets

(56) References Cited

U.S. PATENT DOCUMENTS

2015/0310645 A1* 10/2015 Baumecker ............... G06F 9/30
                                                                     345/440
2016/0112244 A1* 4/2016 Wallerstein ........... H04L 41/069
                                                                     709/224

* cited by examiner

SYSTEM AND METHOD FOR CONTEXTUAL CLUSTERING OF GRANULAR CHANGES IN CONFIGURATION ITEMS

TECHNICAL FIELD

The present disclosure relates generally to contextual clustering of granular changes in configuration items of information technology (IT) systems.

BACKGROUND

In the past decades information technology (IT) systems have evolved and increased in complexity. In the past a company would use a single computer with a single operating system and small number of programs to supply the computational needs of the company. Nowadays enterprise companies may have hundreds and thousands of computers interconnected over a network. The company may use multiple servers and multiple databases to service hundreds and thousands of computers connected to them. Essentially each layer of the IT system has evolved and become more complex to control and manage. In some cases multiple servers may be installed with identical software and load balancers may be used to regulate access to the servers. An average business system includes tens or hundreds of thousands of configuration parameters. For example Windows OS contains between 1,500 to 2,500 configuration parameters. IBM WebSphere Application Server has about 16,000, and Oracle Weblogic more than 60,000. If any of these parameters are misconfigured or omitted the change may impact proper operations of the IT system.

The dependence of IT systems on the configuration can have serious consequences, for example in April 2011 Amazon Web Services suffered a devastating event that knocked offline some of their clients for as much as four days. It turned out that a network configuration error made during a network upgrade caused the problem. In the past upgrades were rare and applied slowly to the client servers. Nowadays especially with the help of the Internet upgrades for some software packages may be released on a daily basis and even automatically applied. If a problem arises in response to an upgrade most systems are incapable of presenting an administrator with a list of changes let alone suggest what changes are the most probable cause of the problem.

It is thus desirable to improve the ability to avoid problems in IT system updates and day-to-day operation and to reduce the mean time to resolution (MTTR) for handling problems that still occur in the IT systems. The prevention of problems and reduction of the MTTR can help to prevent economic damage to the organization.

A few companies have developed software products that help system administrators to keep track of changes to computer configurations. These products detect granular changes to configuration items (CI). Typically such products collect and store the configuration items (CI) in a database so that the current value of a configuration item may be compared to prior values or to similar machines. The products may also bundle configuration items into composite CI's to enable easier visualization of the CI's, for example by grouping them by their type or content. Once the configuration items are collected an IT user (e.g. engineer, system administrator) may need to analyze hundreds, thousands or millions of granular changes or groups of changes to detect the source of a problem.

SUMMARY

An aspect of an embodiment of the disclosure relates to a system and method for clustering changes in configuration items in an IT system based on contextual information related to the configuration items and not based on the content of the configuration items. The system includes a database for storing configuration items that changed and a server that runs an analysis program to cluster the configuration items into clusters. Each cluster represents an IT action that caused change to multiple configuration items.

The configuration items are analyzed to identify clusters of configuration items having similar characteristics, for example configuration items that were changed on a specific host station in the IT system or configuration items that were changed at about the same time. Additionally, the contextual information may include item location (e.g. similar root file path), environment (e.g. which operating system and what hardware is used), version and other details. The clustering may be performed in multiple levels wherein in each level a different distance measure is used to further improve the clustering process of the configuration items.

In some embodiments of the disclosure, a knowledgebase identifying actual IT actions that were performed is used to cluster configuration items. Optionally, information from the knowledgebase is used to determine which configuration items belong to the IT action. Accordingly, the configuration items that are similar by belonging to known IT actions can be clustered leaving a group of ungrouped changes to be clustered based on other similarities as explained above.

There is thus provided according to an exemplary embodiment of the disclosure, a method of clustering changes to configuration items in an information technology (IT) system, comprising:

Collecting changed configuration items executed on computer stations connected in a network implementing the information technology system;

Storing the collected configuration items, in a database;

Analyzing contextual information related to the configuration items to identify clusters having similar characteristics;

Clustering the configuration items based on the identified clusters having similar characteristics; and Assigning a descriptor to each cluster to identify it as an IT action.

In an exemplary embodiment of the disclosure, information from a knowledgebase is used to identify clusters of configuration items that are similar by belonging to a same IT action recorded in the knowledgebase. Optionally, the configuration items that do not match any of the IT actions based on the information in the knowledgebase form a cluster of ungrouped changes. In an exemplary embodiment of the disclosure, the ungrouped changes are further analyzed and clustered using different distance measures. Optionally, the analyzing includes using multiple levels of analysis, wherein a first level accepts the changed configuration items and clusters them based on a first similar characteristic and further levels accept the clustered configuration items and narrow the clusters by limiting the members to match additional similar characteristics.

In an exemplary embodiment of the disclosure, in the first level the changed configuration items are clustered by the host on which they were changed or by the time when the change occurred. Optionally, in further levels the changed configuration items are clustered by the host, time, and location of the item, environment or version. In an exemplary embodiment of the disclosure, in one of the levels after the first level information from a knowledgebase is used to narrow down the clusters by further clustering configuration items that are similar by belonging to a same IT action recorded in the knowledgebase. Optionally, the IT actions include adding, updating or removing applications in the IT system. In an exemplary embodiment of the disclosure, the IT system provides a list of IT actions with a human readable description.

There is further provided according to an exemplary embodiment of the disclosure, a system for clustering changes to configuration items in an information technology (IT) system, comprising:

A database for storing changed configuration items;

A computer having a processor and memory serving as an analysis server;

An analysis program executed by the computer;

Wherein the analysis program:

Collects changed configuration items executed on computer stations connected in a network implementing the information technology system;

Stores the collected configuration items in a database;

Analyzes contextual information related to the configuration items to identify clusters having similar characteristics;

Clusters the configuration items based on the identified clusters having similar characteristics; and Assigns a descriptor to each cluster to identify it as an IT action.

In an exemplary embodiment of the disclosure, information from a knowledgebase is used to identify clusters of configuration items that are similar by belonging to a same IT action recorded in the knowledgebase. Optionally, configuration items that do not match any of the IT actions based on the information in the knowledgebase form a cluster of ungrouped changes. In an exemplary embodiment of the disclosure, the ungrouped changes are further analyzed and clustered using different similar characteristics. Optionally, the analyzing includes using multiple levels of analysis, wherein a first level accepts the changed configuration items and clusters them based on a first similar characteristic and further levels accept the clustered configuration items and narrow the clusters by limiting the members to match additional similar characteristics.

In an exemplary embodiment of the disclosure, in the first level the changed configuration items are clustered by the host on which they were changed or by the time when the change occurred. Optionally, in further levels the changed configuration items are clustered by the host, time, and location of the item, environment or version. In an exemplary embodiment of the disclosure, in one of the levels after the first level information from a knowledgebase is used to narrow down the clusters by further clustering configuration items that are similar by belonging to a same IT action recorded in the knowledgebase. Optionally, the IT actions include adding, updating or removing applications in the IT system.

There is further provided in an exemplary embodiment of the disclosure, a non-transitory computer readable medium for storing program code to execute the method described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
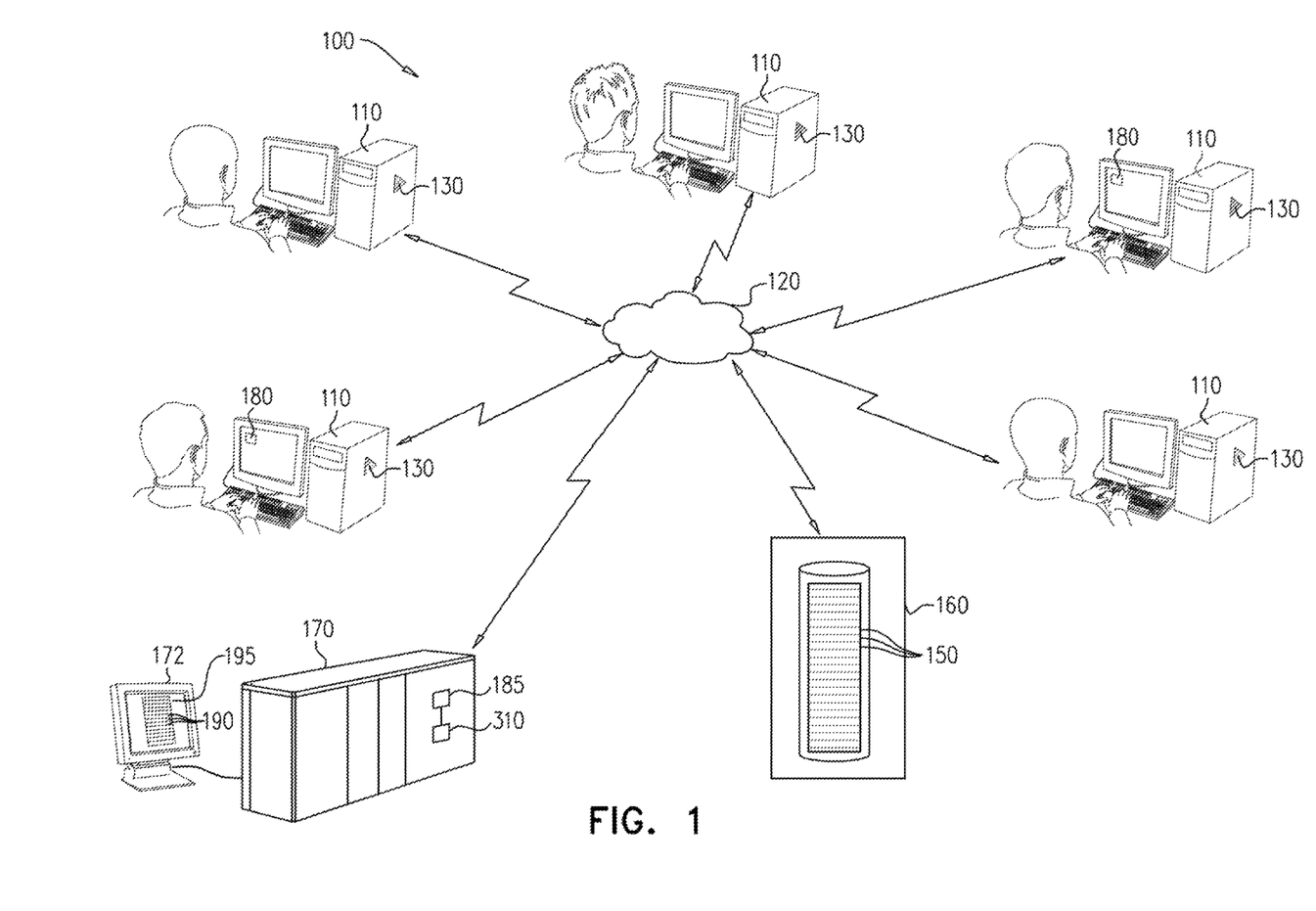
FIG. 1 is a schematic illustration of a network of computers connected in an information technology system, according to an exemplary embodiment of the disclosure.

FIG. 1 is a schematic illustration of a network of computers connected in an information technology system 100, according to an exemplary embodiment of the disclosure. In an exemplary embodiment of the disclosure, IT system 100 includes multiple stations 110 connected over a network 120. Optionally, each station 110 may serve as a workstation for accessing servers or may be a server for providing Services to users of workstations. Network 120 may be a local area network (LAN), a wide area network (WAN) (e.g. the Internet) or any other type of network over which stations 110 may communicate. Optionally, each station 110 executes an agent application 130 for monitoring and collecting information at the station 110. The collected information includes configuration items 150 relating to the hardware and software installed in the stations 110 of IT system 100. Optionally, the configuration items 150 may be collected periodically or upon occurrence of a change to the configuration items 150. In some embodiments of the disclosure, the configuration items 150 may be only collected on specific stations 110, for example only on servers or only on specific servers that are important to IT system 100.

The stations 110 may be any type of general purpose computer. Optionally, they may be standard desktop computers, dedicated server computers, rack mount computers, laptop computers, mobile devices or any other type of computational device having a processor and memory.

In an exemplary embodiment of the disclosure, the information collected by agent application 130 is stored in a database 160. Optionally, an agent server 170 uses an analysis program 185 to analyze the collected information to detect IT actions 190 that caused a change to the collected information. In an exemplary embodiment of the disclosure, the IT actions 190 may cause change in configuration items 150 of a single station 110 or on multiple stations 110. In an exemplary embodiment of the disclosure, the user (e.g. the IT administrator) is provided (e.g. on a display 172 or printed hardcopy) with a list 195 of the IT actions 190 that were detected with their contextual information, for example time of occurrence, location, name of initiator and other details. In case of a problem the user can identify one or more IT actions 190 that occurred prior to the problem and may have the option of reversing the IT action 190. Alternatively or additionally, the user can zoom in on individual configuration items 150 belonging to the IT action 190 to identify problematic configuration items or values.

In an exemplary embodiment of the disclosure, analysis program 185 may be transferred on a non-transitory computer readable medium for storing program code to agent server 170. Optionally, the medium includes a CD, DVD, diskonkey, USB drive, magnetic media, optical media or other types of media.

In an exemplary embodiment of the disclosure, agent application 130 is provided with a list of application definitions specifying what to collect and how, for example to track changes in all files in a specific directory, track changes in registry entries or collect the values of specific entries in a database.

In some embodiments of the disclosure, instead of installing a dedicated agent application 130, the information is collected by standard API applications that are executed by the local operating system on the station 110 responsive to a request from agent server 170 or from other computer stations 110. Optionally, agent server 170 polls the stations 110 to extract the information instead of extracting the information directly from database 160, and then agent server 170 stores the information in database 160.

The configuration items 150 may include hardware details of the station 110, for example the amount of RAM, processor model, disk size, and models of devices attached. Optionally, the configuration items 150 may include firmware details, such as BIOS version, BIOS size and a checksum (e.g. CRC). Alternatively or additionally, the configuration parameters 150 may include details of application software installed on the station 110, including metadata (e.g. when installed and by whom) and application data.

The applications may include operating systems, client server applications, database applications, or corporate applications used by a corporation to support the corporate activity, for example the applications may include SQL servers and web servers.

In an exemplary embodiment of the disclosure, configuration items 150 of applications may include: application identity, application version, date of installation, name of the user that installed the application, updates installed, drivers installed, names and sizes of files belonging to each application, values of controllable parameters for configuring applications, file sizes, file checksums, registry content, available RAM, available disk space and any other information for identifying the status or affect of the software installed on the stations 110. Optionally, the number of recorded configuration items 150 dealt with by IT system 100 may be between 10 to 100, 100 to 1000, 1000 to 10000, 10000 to 100000 or more.

In some embodiments of the disclosure, agent application 130 may be installed on one or more stations 110 that are not connected together over a network, for example at different organizations/clients. Optionally, the information may be stored locally and collected for example using an external disk, diskonkey or by temporarily connecting the station to a wide area network such as the Internet and transmitting the information to database 160. In an exemplary embodiment of the disclosure, agent server 170 can be used to examine installations of applications at different organizations/clients, to debug applications or resolve problems in installations.

In an exemplary embodiment of the disclosure, agent server 170 clusters granular changes of configuration items 150 into higher level objects, namely IT actions 190 so that an IT user does not need to analyze granular changes but rather a much shorter list of items. Optionally, each IT action 190 includes tens, hundreds, thousands, or more configuration items thus reducing the amount of information an IT user needs to review.

In an exemplary embodiment of the disclosure, an IT action 190 corresponds to actual events in the IT system 100. A typical example of an IT action 190 is a Windows Update event. When this event happens, it may make hundreds of changes to the system (change, delete, create, update files). All these changes are recorded as separate granular changes at particular configuration items. When a problem occurs, the IT user is required to review all of the granular changes and many others, to identify a root cause for the problem. Having all these granular changes to review, makes this task difficult like searching for a needle in a haystack. However, grouping (clustering) all the changes that correspond to the same IT action 190 into a configuration item, for example, "Windows Update KB2756872", will significantly reduce the number of items that need to be reviewed. This way, instead of showing all the granular changes to the admin to revise, the system shows only the aggregated IT actions 190.

In an exemplary embodiment of the disclosure, the IT actions 190 are initiated by various sources, for example application updates, releases, patches, maintenance, deployments, management operations, and similar actions. In general, there are three basic types of IT actions 190:

1. Add—an artifact is installed, added, enabled, or appended
2. Update—an artifact is modified, replaced, or patched
3. Remove—an artifact is uninstalled, removed, deleted, or disabled In an exemplary embodiment of the disclosure, the present disclosure introduces a method and system for contextual clustering of granular changes in configuration items 150 that is, clustering them into IT actions 190. Optionally, the method uses the contextual information of each change and groups similar changes, for example changes that occurred within the same IT action 190 (e.g. installing a new program or a Windows Update). The contextual information consists of (but is not limited to): the time when the change happened, the location in the file system, the host where it occurred, the environment in which it occurred (for example, SQL server), the type of the host where it occurred, the size of the file that was changed, etc.

Figure 2A:
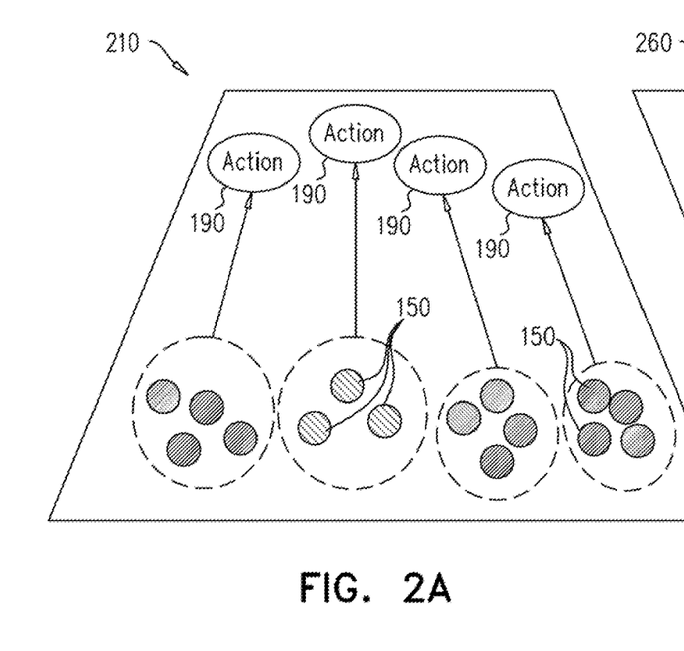
FIG. 2A is a schematic illustration of a bottom up mechanism for grouping configuration items into IT actions, according to an exemplary embodiment of the disclosure.
Figure 2B:
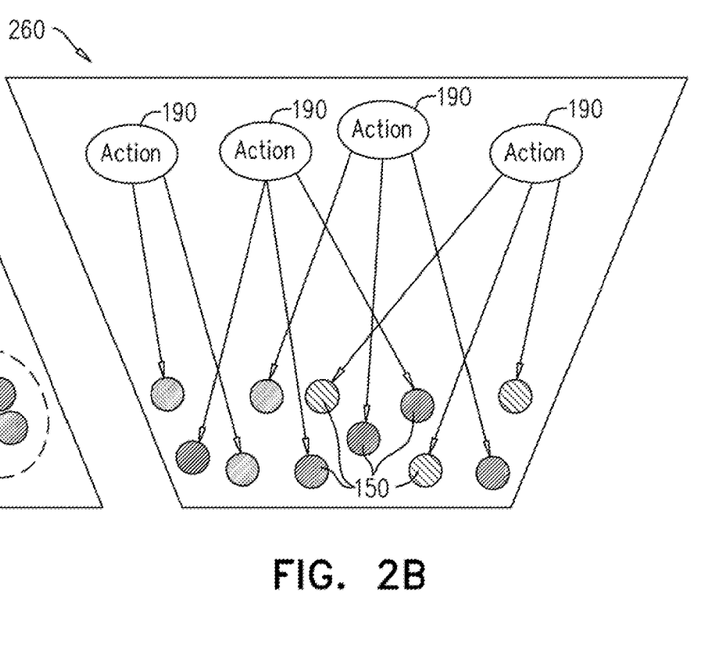
FIG. 2B is a schematic illustration of a top down mechanism for grouping configuration items into IT actions, according to an exemplary embodiment of the disclosure.

FIG. 2A is a schematic illustration of a bottom up 210 approach for grouping configuration items 150 into IT actions 190, and FIG. 2B is a schematic illustration of a top down 260 approach for grouping configuration items 150 into IT actions 190, according to an exemplary embodiment of the disclosure.

In an exemplary embodiment of the disclosure, the method is based on the two interrelated approaches: the bottom up approach 210 and the top-down approach 260. The bottom up approach 210 is unsupervised, that is, it only analyzes the changes and groups them according to a distance measure that represents a level of similarity or distinctness (clustering approach). The distance measure is defined using the contextual information of the installation of the IT action 190. On the other hand, the top-down approach 260 is supervised, that is, pre-defined patterns are used to detect if the changes belong to some pre-defined IT action 190. For example, a generic pattern that detects Windows updates can be used to detect and group the changes that correspond to a particular Windows update.

Figure 3:
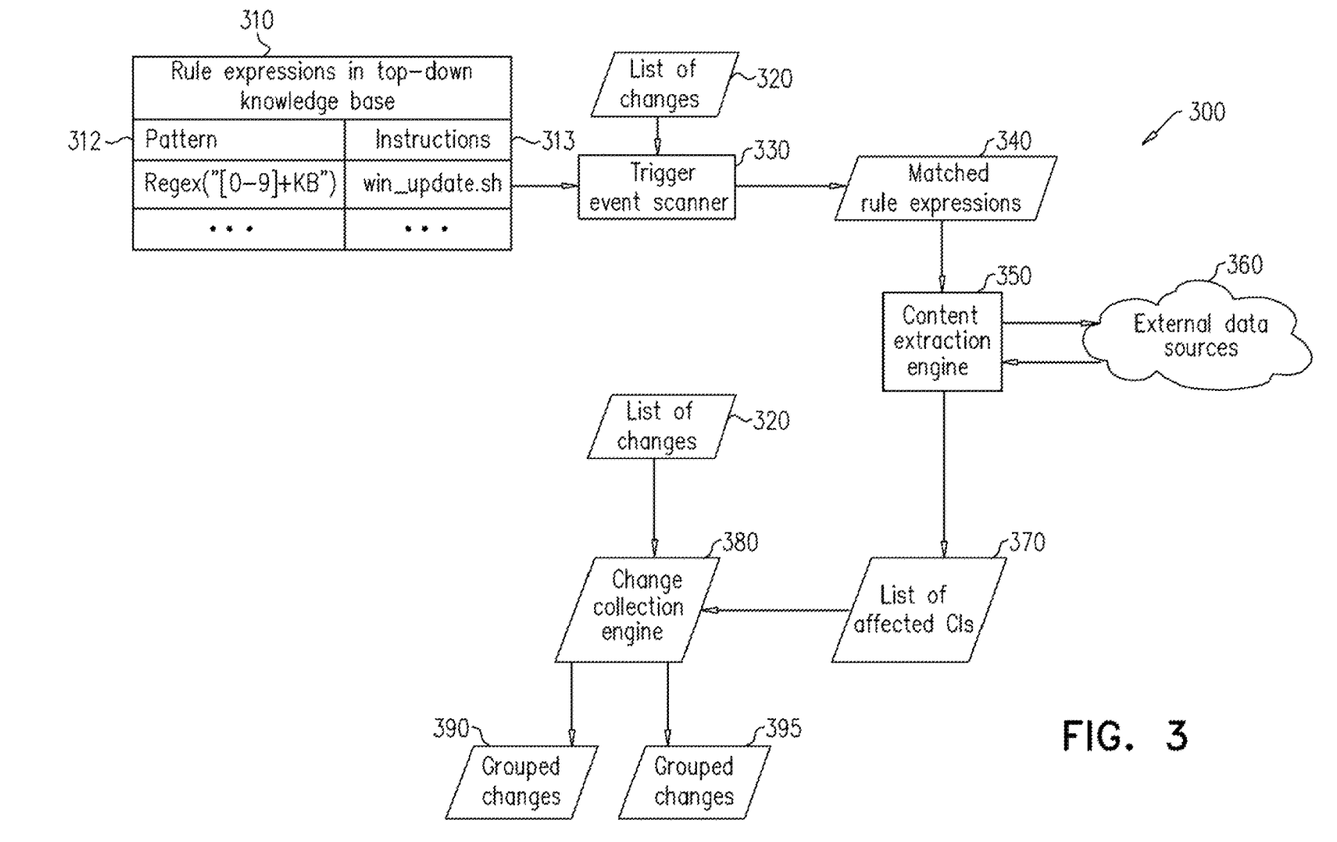
FIG. 3 is a flow diagram of a method of identifying IT actions with a top down approach, according to an exemplary embodiment of the disclosure.

FIG. 3 is a flow diagram 300 of a method of identifying IT actions 190 with the top down approach 260, according to an exemplary embodiment of the disclosure. In an exemplary embodiment of the disclosure, the top down approach 260 uses a knowledgebase 310 in which rule expressions are defined for identifying known IT actions 260. Optionally, the rules include the following components: trigger event, content extraction, and change collection. The first part defines a pattern 312, which is used to identify that an IT Action 190 has been triggered, for example, a particular line in a system log, executed deployment script or other options. The second part, specifies instructions 313 to collect additional information about the IT action from external sources such as the Internet, a source version control system, and others, to provide a list of artifacts affected by the IT Action 190. The last part, change collection, collects changes on affected artifacts and groups them into the IT Action 190. An example of the top-down approach is Windows update KB12345. An example of a pattern is a new line in the system update logs. When a new line appears, the second part executes a set of steps that download Window's knowledge base article titled "KB12345 Security update" describing the update, parses the content, and extracts the list of libraries and other elements affected by the update. The change collection engine 380 then scans the actual changes in the system and adds matching changes to a Windows update IT Action.

In an exemplary embodiment of the disclosure, an event scanner 330 is triggered by receiving a list of changes 320 and the rule expressions in knowledgebase 310 with the pattern 312 indicating a new IT action 190. Optionally, the event scanner 330 identifies matched rule expressions 340 and activates a content extraction engine 350. The content extraction engine 350 receives information from external data sources 360 identifying configuration items 150 that are affected by the IT action 190. In an exemplary embodiment of the disclosure, content extraction engine 350 provides a list 370 of configuration items or composite configuration items 150 per IT action 190. Optionally, a change collection engine 380 receives the list of configuration items 370 and the original list of changes 320 to determine, which changes were grouped 390 into IT actions 190 and which changes were ungrouped 395. The grouped changes 390 do not require further identifying, whereas the ungrouped changes 395 form a cluster that can be further processed by the bottom up approach 210.

A disadvantage of the top down approach 260 is that it cannot deal with IT actions, which are not described by the knowledgebase 310. This problem is expected, as it is not feasible to describe and foresee all possible IT actions that happen in IT systems. To deal with this problem, we use the bottom-up approach 210 to identify IT actions from the remaining granular changes.

Figure 4:
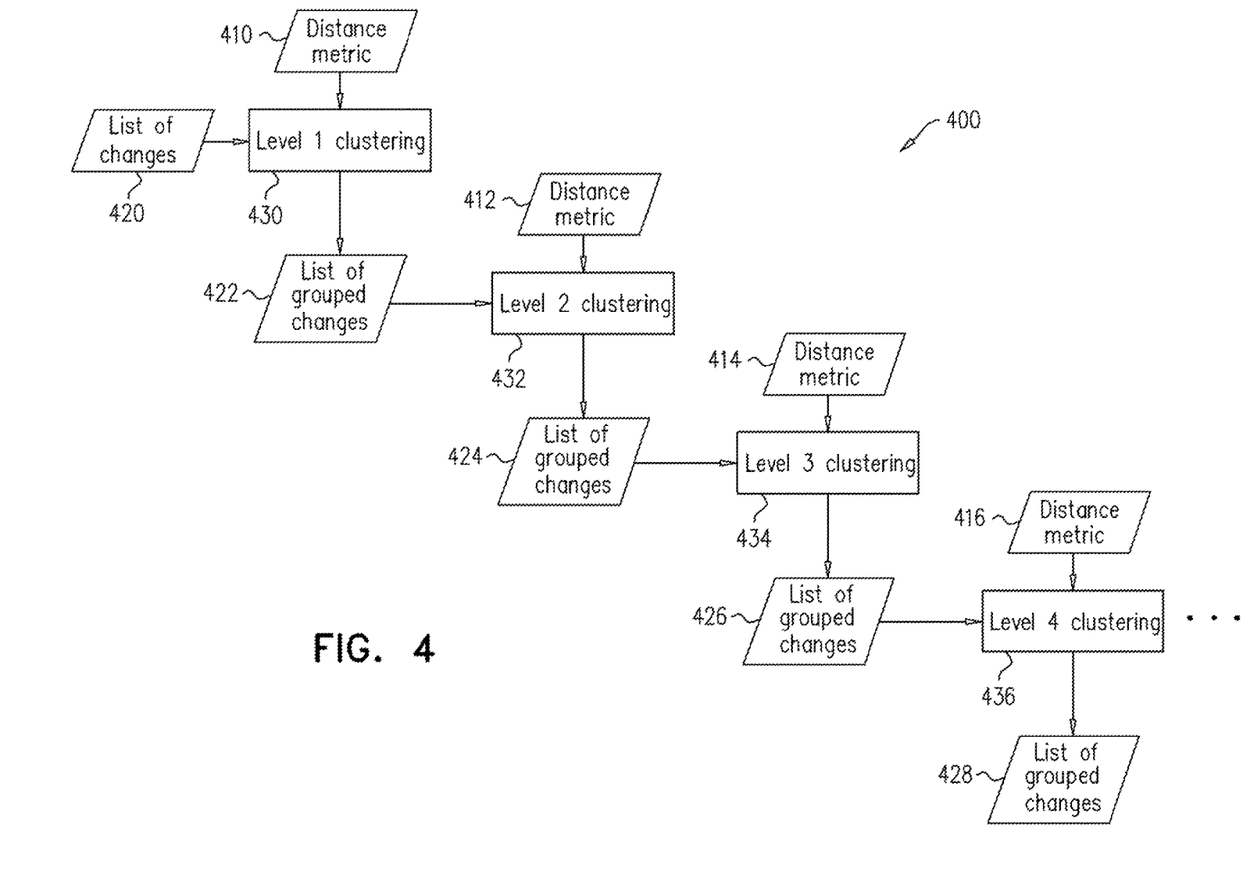
FIG. 4 is a flow diagram of a method of identifying IT actions with a bottom up approach, according to an exemplary embodiment of the disclosure.

FIG. 4 is a flow diagram 400 of a method of identifying IT actions with the bottom up approach 210, according to an exemplary embodiment of the disclosure. In an exemplary embodiment of the disclosure, the bottom up approach 210 is unsupervised, that is, it only analyzes the changes and groups them according to their distance measure (clustering approach). The distance measure is defined using the contextual information of the configuration items 150 (time, host, environment, path location, etc. in contrast to analysis based on the content of the configuration items 150). Optionally, the distance measure analysis is applied in several steps. The clustering process may be applied several times recursively with different distance measures. For instance, first-level clustering emphasizes time, second-level clustering focuses on host and environment, third-level clustering deals with the location of the configuration items 150, fourth-level clustering merges IT Actions 190 changing to the same version etc. Alternatively, a single level may be used in which different distance measures with different weights are used to cluster the changes.

In an exemplary embodiment of the disclosure, a clustering algorithm groups similar items in such a way that items in the same group are more similar to each other that to those in other groups. The distance measure, represents how similar one item is to another, and serves as a key component in clustering algorithms. Optionally, in the bottom-up approach 210 the clustering is applied at several levels. Optionally, the proposed method uses a different distance measure (410, 412, 414, 416 . . . ) to evaluate distance at each level. It first creates large clusters and then creates smaller clusters within the existing clusters, for example as shown in FIG. 4 each level includes a clustering engine (430, 432, 434, 436 . . . ). Each clustering engine (430, 432, 434, 436 . . . ) accepts as input a list of changed configuration items (420, 422, 424, 426 . . . ) that was optionally further grouped by a previous level (except in the first level 420). The clustering engine (430, 432, 434, 436 . . . ) then outputs a list of changes that is further grouped into a larger or smaller sized groups. Alternatively or additionally, some levels may increase the number of groups and some levels may decrease the number of groups (e.g. by merging groups). Optionally, weights/scores may be used in combining the groups. Alternatively, the comparison may be limited to a simple match/don't match.

For example, an instance of bottom up clustering may use the following cluster levels:

1. Level 0 clustering: cluster all configuration item changes 150 by host so that the changes in the same host are grouped together 2. Level 1 clustering: cluster changes by time
   a. Select the change with the lowest time stamp as an initial seed
   b. For each change:
      i. If the time difference for two configuration items 150 is less than x minutes later than previous change, add it to previous change
      ii. Else, add change as a seed to a new cluster 3. Level 2 clustering: cluster changes by file path First, split the path to regions, e.g., C:/Program files/My program becomes a set of ['C' Program files, 'My program']. Now, the distance between two paths could be defined as a Jaccard distance between two sets $$J(A, B) = \frac{|A \cap B|}{|A \cap B|} = \frac{|A \cap B|}{|A| + |B| - |A \cap B|}.$$

1. Select a random change path as an initial seed
2. For each change
   a. If change path is similar to one of the existing cluster seeds, add to the cluster and normalize cluster seed representative (cluster seed representative corresponds to intersection of path segments between existing seed and new change path)
   b. Else, add it as a seed to another cluster Level 3: Cluster based on common version update or common path Level 4: Cluster based on common seed or changes updated to the same version.

Figure 5:
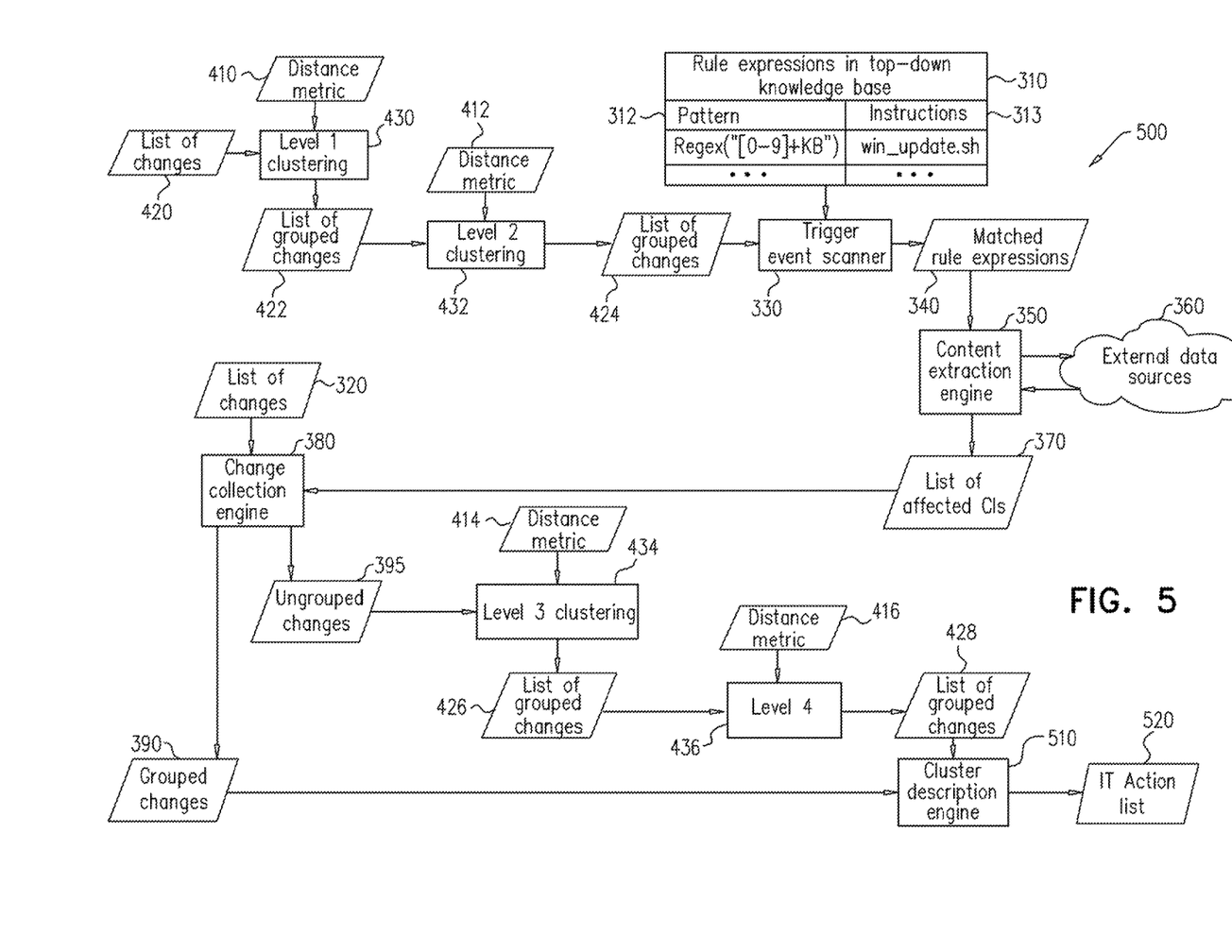
FIG. 5 is a flow diagram of a combined method of identifying IT actions with a top down approach and a bottom up approach, according to an exemplary embodiment of the disclosure.

FIG. 5 is a flow diagram 500 of a combined method of identifying IT actions with a top down approach 260 and a bottom up approach 210, according to an exemplary embodiment of the disclosure. In an exemplary embodiment of the disclosure, the initial list of configuration items 150 that changed 420 is provided to one or more initial levels of bottom up clustering (e.g. 430, 432) to group the configuration items by characteristics that are almost always common to an IT group 190, for example host and time. Afterwards, the results (list of grouped changes 424) are processed by bottom down clustering to remove identified IT actions 190 (based on the knowledgebase 310). The remaining ungrouped changes 395 are then processed by further levels of bottom up clustering (e.g. 434, 436), which may group the configuration items 150 with less certainty than the initial levels.

In an exemplary embodiment of the disclosure, the results of the top down approach, bottom up approach or the combined approach are all provided to a cluster description engine 510 that defines a descriptor for the IT actions 190 that were clustered based on known IT actions 190 listed in the knowledgebase and for the pseudo IT actions 190 that were created based on distance measure and not based on known IT actions 190. Optionally, a list of IT actions 520 containing both the pseudo IT actions and the known IT actions is provided as the end result.

In an exemplary embodiment of the disclosure, the cluster descriptor is assigned based on context free grammar (CFG) and/or linguistic analysis. Optionally, the core of linguistic analysis is extraction of five key elements: object, verb, parameter, action, and value. The elements could be then combined into a human-readable description as follows (but not limited to):

<object> <verb>[<parameter>]<action>[to <value>]

An example would be:

Alchemy has version updated to 9.0.8192 context free grammar (CFG) production would then be:
    <object>={Last part of CI path}|{Common CI name}
    <verb>=is|was|has|are|were|have
    <action>=<added>|<updated>|<removed>
    <added>=installed|added|enabled|tracking enabled
    <updated>=updated|modified|replaced|minor/major update
    <removed=removed|uninstalled|deleted|disabled|tracking disabled Terminal nodes and terminal parameters are determined by a set of algorithms.

<action>

First, the algorithm determines which verb best describes the groups of changed configuration items. The algorithm inspects the path, parameter and value of all configuration items in the cluster.

Determine context of CI such as type, value, what happened
    Installable components: installed/uninstalled
    Boolean value (on/off, 1/0, enabled/disabled, engansed/disengaged, . . . )
    Component added/removed/replaced <verb>

Next, the algorithm determines if a verb is pluralized according to the number of objects in the cluster and how the object is already pluralized.

1. If object is pluralized, return pluralized verb
    2. Else if number of changes in cluster is more than one, return pluralized verb
    3. Else, return singularized verb In some embodiments of the disclosure, agent server 170 may be activated continuously as a member of IT system 100 or agent server 170 may be activated periodically (e.g. every hour, every day, every week) to verify correctness of IT system 100 and/or verify correctness of changes occurring in IT system 100.

In some embodiments of the disclosure, the information provided to knowledgebase 310 may be used to verify the correctness of identified IT actions 190 performed on IT system 100, for example by verifying that the expected values match those actually collected.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of identifying IT actions causing problems in an information technology (IT) system, the method comprising:
    using one or more processors for,
    collecting changed configuration items executed on computer stations connected in a network implementing the information technology system;
    storing the collected configuration items in a database;
    analyzing, with a computer having a processor and memory serving as an analysis server, contextual information related to the configuration items but not based on the content of the configuration items to identify clusters having similar characteristics; and wherein a knowledgebase is pre-defined with patterns of configuration item that are changed in response to specific IT actions; wherein the pre-defined patterns from the knowledgebase are used to identify clusters of configuration items that belong to the specific IT action;
    clustering the configuration items based on the identified clusters having similar characteristics or meeting the pre-defined patterns;
    assigning a descriptor to each cluster to identify it as an IT action;
    providing a user, a list of identified IT actions with a human readable description, including a timestamp for each one of said IT actions;
    identifying one or more IT actions that occurred before a problem in the IT system occurred; and
    wherein the analysis server debugs applications or resolves problems in installations or updates based on the identified IT actions;
    wherein the analyzing includes using multiple levels of analysis, wherein a first level accepts the changed configuration items and clusters them based on a first similar characteristic and further levels accept the clustered configuration items and narrow the clusters by limiting the members to match additional similar characteristic.

2. A method according to claim 1, wherein configuration items that do not match any IT action recorded in the knowledgebase form a cluster of ungrouped changes.

3. A method according to claim 2, wherein the ungrouped changes are further analyzed and clustered using different distance measures.

4. A method according to claim 1, wherein the first level the changed configuration items are clustered by a host on which they were changed or by time when a change occurred.

5. A method according to claim 4, wherein in said further levels, the changed configuration items are clustered by the host, time, location of an item, environment or version.

6. A method according to claim 4, wherein in one of said further levels, information from the knowledgebase is used to narrow down the clusters by further clustering configuration items that are similar by belonging to a same IT action recorded in the knowledgebase.

7. A method according to claim 1, wherein the identified IT action includes adding, updating or removing applications in the IT system.

8. A method according to claim 1, wherein the cluster descriptor is assigned based on context free grammar and linguistic analysis of meta-data related to the changed configuration items in the cluster.

9. A system for identifying IT actions causing problems in an information technology (IT) system, the system comprising:
   a database for storing changed configuration items;
   a computer having a processor and memory serving as an analysis server;
   an analysis program executed by the computer;
   wherein the analysis program:
   collects changed configuration items executed on computer stations connected in a network implementing the information technology system;
   stores the collected configuration items in a database;
   analyzes contextual information related to the configuration items but not based on the content of the configuration items to identify clusters having similar characteristics; and wherein a knowledgebase is pre-defined with patterns of configuration item that are changed in response to specific IT actions; wherein the pre-defined patterns from the knowledgebase are used to identify clusters of configuration items that belong to the specific IT action;
   clusters the configuration items based on the identified clusters having similar characteristics or meeting the pre-defined patterns;
   assigns a descriptor to each cluster to identify it as an IT action;
   provides a user with a list of identified IT actions with a human readable description, including a timestamp for each one of said IT actions; and
   identifies one or more IT actions that occurred before a problem in the IT system occurred;
   and wherein the analysis server debugs applications or resolves problems in installations based on the identified IT actions;
   wherein the analyzing includes using multiple levels of analysis, wherein a first level accepts the changed configuration items and clusters them based on a first similar characteristic and further levels accept the clustered configuration items and narrow the clusters by limiting the members to match additional similar characteristics.

10. A system according to claim 9, wherein configuration items that do not match any IT action recorded in the knowledgebase form a cluster of ungrouped changes.

11. A system according to claim 10, wherein the ungrouped changes are further analyzed and clustered using different similar characteristics.

12. A system according to claim 9, wherein the first level the changed configuration items are clustered by a host on which they were changed or by time when a change occurred.

13. A system according to claim 12, wherein in said further levels the changed configuration items are clustered by the host, time, location of an item, environment or version.

14. A system according to claim 12, wherein in said further levels, information from the knowledgebase is used to narrow down the clusters by further clustering configuration items that are similar by belonging to a same IT action recorded in the knowledgebase.

15. A system according to claim 9, wherein the identified IT action includes adding, updating or removing applications in the IT system.

16. A non-transitory computer readable medium for storing program code to execute the method comprising:
   collecting changed configuration items executed on computer stations connected in a network implementing the information technology system;
   storing the collected configuration items in a database;
   analyzing, with a computer having a processor and memory serving as an analysis server, contextual information related to the configuration items but not based on the content of the configuration items to identify clusters having similar characteristics; and wherein a knowledgebase is pre-defined with patterns of configuration item that are changed in response to specific IT actions; wherein the pre-defined patterns from the knowledgebase are used to identify clusters of configuration items that belong to the specific IT action;
   clustering the configuration items based on the identified clusters having similar characteristics or meeting the pre-defined patterns;
   assigning a descriptor to each cluster to identify it as an IT action;
   providing a user, a list of identified IT actions with a human readable description, including a timestamp for each one of said IT actions;
   identifying one or more IT actions that occurred before a problem in the IT system occurred; and
   wherein the analysis server debugs applications or resolves problems in installations or updates based on the identified IT actions;
   wherein the analyzing includes using multiple levels of analysis, wherein a first level accepts the changed configuration items and clusters them based on a first similar characteristic and further levels accept the clustered configuration items and narrow the clusters by limiting the members to match additional similar characteristic.

* * * * *